US012807199B2

(12) United States Patent
Ma et al.

(10) Patent No.: US 12,807,199 B2
(45) Date of Patent: Nov. 24, 2026

(54) SYSTEM AND METHOD FOR MEASURING DISPLACEMENT OF SWITCH MACHINE ACTUATING ROD

(71) Applicant: CRSC COMMUNICATION & INFORMATION CORPORATION SHANGHAI CO., LTD., Shanghai (CN)

(72) Inventors: Sai Ma, Shanghai (CN); Weiming Chen, Shanghai (CN)

(73) Assignee: CRSC COMMUNICATION & INFORMATION CORPORATION SHANGHAI CO., LTD., Shanghai (CN)

( * ) Notice: Subject to any disclaimer, the term of this patent is extended or adjusted under 35 U.S.C. 154(b) by 445 days.

(21) Appl. No.: 18/574,039

(22) PCT Filed: Apr. 11, 2023

(86) PCT No.: PCT/CN2023/087539

§ 371 (c)(1),
(2) Date: Dec. 24, 2023

(87) PCT Pub. No.: WO2024/011974

PCT Pub. Date: Jan. 18, 2024

(65) Prior Publication Data

US 2025/0100603 A1 Mar. 27, 2025

(30) Foreign Application Priority Data

Jul. 12, 2022 (CN) ........................ 202210818995.7

(51) Int. Cl.
*B61L 27/53* (2022.01)
*B61L 23/04* (2006.01)
(Continued)

(52) U.S. Cl.
CPC ............... *B61L 27/53* (2022.01); *B61L 23/04* (2013.01); *B61L 27/70* (2022.01); *G01B 11/14* (2013.01)

(58) Field of Classification Search
CPC .......... B61L 27/53; B61L 27/70; B61L 23/04; G01B 11/14
See application file for complete search history.

(56) References Cited

FOREIGN PATENT DOCUMENTS

| | | |
|---|---|---|
| CN | 2594104 | 12/2003 |
| CN | 202508119 | 10/2012 |

(Continued)

OTHER PUBLICATIONS

"International Search Report (Form PCT/ISA/210) of PCT/CN2023/087539", mailed on Jul. 4, 2023, pp. 1-4.

(Continued)

*Primary Examiner* — Robert J McCarry, Jr.
(74) *Attorney, Agent, or Firm* — JCIPRNET

(57) ABSTRACT

The present invention relates to a system and method for measuring displacement of a switch machine actuating rod, the system including a laser sensor, an acquisition unit, a communication unit, a station server, and a station monitoring terminal, wherein the laser sensor and the acquisition unit are respectively mounted in a switch machine; the laser sensor is fixed at one end of the switch machine actuating rod; the acquisition unit is connected to the communication unit; the communication unit is connected to the station server; and the station server is connected to the station monitoring terminal and a signal centralized monitoring system server respectively. Compared with the prior art, the present invention can acquire displacement data of the actuating rod of an S700K-C type switch machine during (Continued)

switch transaction and train passing, and can still better monitor and analyze an operating state of the switch machine.

9 Claims, 3 Drawing Sheets

(51) Int. Cl.
*B61L 27/70* (2022.01)
*G01B 11/14* (2006.01)

(56) References Cited

FOREIGN PATENT DOCUMENTS

| | | | | |
|---|---|---|---|---|
| CN | 204085438 | | 1/2015 | |
| CN | 107226109 | | 10/2017 | |
| CN | 212289862 | | 1/2021 | |
| CN | 113460122 | | 10/2021 | |
| CN | 113460122 A | * | 10/2021 | .............. B61L 5/102 |
| CN | 218066324 | | 12/2022 | |
| JP | 2020060067 | | 4/2020 | |

OTHER PUBLICATIONS

"Written Opinion of the International Searching Authority (Form PCT/ISA/237) of PCT/ CN2023/087539", mailed on Jul. 4, 2023, pp. 1-5.

* cited by examiner

SYSTEM AND METHOD FOR MEASURING DISPLACEMENT OF SWITCH MACHINE ACTUATING ROD

CROSS-REFERENCE TO RELATED APPLICATION

This application is a 371 of international application of PCT application serial no. PCT/CN2023/087539, filed on Apr. 11, 2023, which claims the priority benefit of China application no. 202210818995.7, filed on Jul. 12, 2022. The entirety of each of the above-mentioned patent application is hereby incorporated by reference herein and made a part of this specification.

TECHNICAL FIELD

The present invention relates to the field of displacement measurement, and more particularly to a system and method for measuring displacement of a switch machine actuating rod.

DESCRIPTION OF RELATED ART

Up to the end of 2020, the mileage of Chinese 350 km/h high-speed railways reached 38000 kilometers, and most of switch devices of the high-speed railways adopted an S700K-C type switch machine. Therefore, the normal operation of the S700K-C type switch machine is related to the steady and safe operation of the high-speed railways. At present, the following operation parameters of the S700K-C type switch machine are monitored: a current power curve during transaction, a switch machine gap, a relay state and the like.

However, a method and system capable of measuring displacement data of a switch machine actuating rod during rotation and train passing is not found on the market, and therefore the operating state of the switch machine cannot be comprehensively monitored and analyzed.

SUMMARY

The objective of the present invention is to overcome the defect in the prior art and provide a system and method for measuring displacement of a switch machine actuating rod.

The objective of the present invention can be realized by the following technical solution:

According to one aspect of the present invention, provided is a system for measuring displacement of a switch machine actuating rod. The system is mounted on a switch machine, and includes a laser sensor, an acquisition unit, a communication unit, a station server, a station monitoring terminal, and a signal centralized monitoring system server, wherein the laser sensor and the acquisition unit are respectively mounted in the switch machine; the laser sensor is fixed at one end of the switch machine actuating rod; the acquisition unit is connected to the communication unit; the communication unit is connected to the station server; and the station server is connected to the station monitoring terminal and the signal centralized monitoring system server respectively.

As a preferred technical solution, a reflection surface of the laser sensor for emitting a laser is a pressure spring adjustment nut of a switch machine connector.

As a preferred technical solution, the acquisition unit includes a digital-to-analog conversion module, a microprocessor, a communication module, and a power supply module; and the microprocessor is connected to the digital-to-analog conversion module, the communication module, and the power supply module respectively.

As a preferred technical solution, the acquisition unit is connected to the communication unit by means of a data wire such as an Ethernet or RS485 or RS422 or RS232 or a CAN bus and the like.

As a preferred technical solution, the communication unit is connected to the station server by means of a power carrier cable or a communication network such as a WLAN or a mobile network or an Ethernet or an optical fiber network and the like.

As a preferred technical solution, the station server is connected to the signal centralized monitoring system server by means of a data wire such as an Ethernet or RS232 or RS485 and the like.

As a preferred technical solution, the station server stores and analyzes a received document.

As a preferred technical solution, the station monitoring terminal can call and read data in the station server, and performs configuration management.

As a preferred technical solution, an acquisition action of the acquisition unit is to regularly acquire an analog current output of the laser sensor.

According to another aspect of the present invention, provided is a measurement method using the system for measuring displacement of a switch machine actuating rod, including the following steps:

Step 1), receiving by the station server section rail occupation information transmitted by the signal centralized monitoring system server, then transmitting a start-to-acquire instruction to the acquisition unit by means of the communication unit, and going to step 2); if no occupation information is received, then going to step 3);

Step 2), receiving by the station server section rail emptying information transmitted by the signal centralized monitoring system server, then transmitting a stop-acquiring instruction to the acquisition unit by means of the communication unit, and going to step 3);

Step 3), receiving by the station server a document formed by acquired data transmitted by the acquisition unit by means of the communication unit, and going back to step 1);

Step 4), receiving by the station server transaction action information of a switch transmitted by the signal centralized monitoring system server, then transmitting a start-to-acquire instruction to all the acquisition units of the switch by means of the communication unit, and going to step 5); and Step 5), receiving by the station server a document formed by the acquired data transmitted by the acquisition unit by means of the communication unit after the regular sampling times exceeds N, and going back to step 1).

Compared with the prior art, the system and method for measuring displacement of a switch machine actuating rod of the present invention can acquire displacement data of the actuating rod during switch transaction and train passing, and can still better monitor and analyze an operating state of the switch machine.

Figure 1:
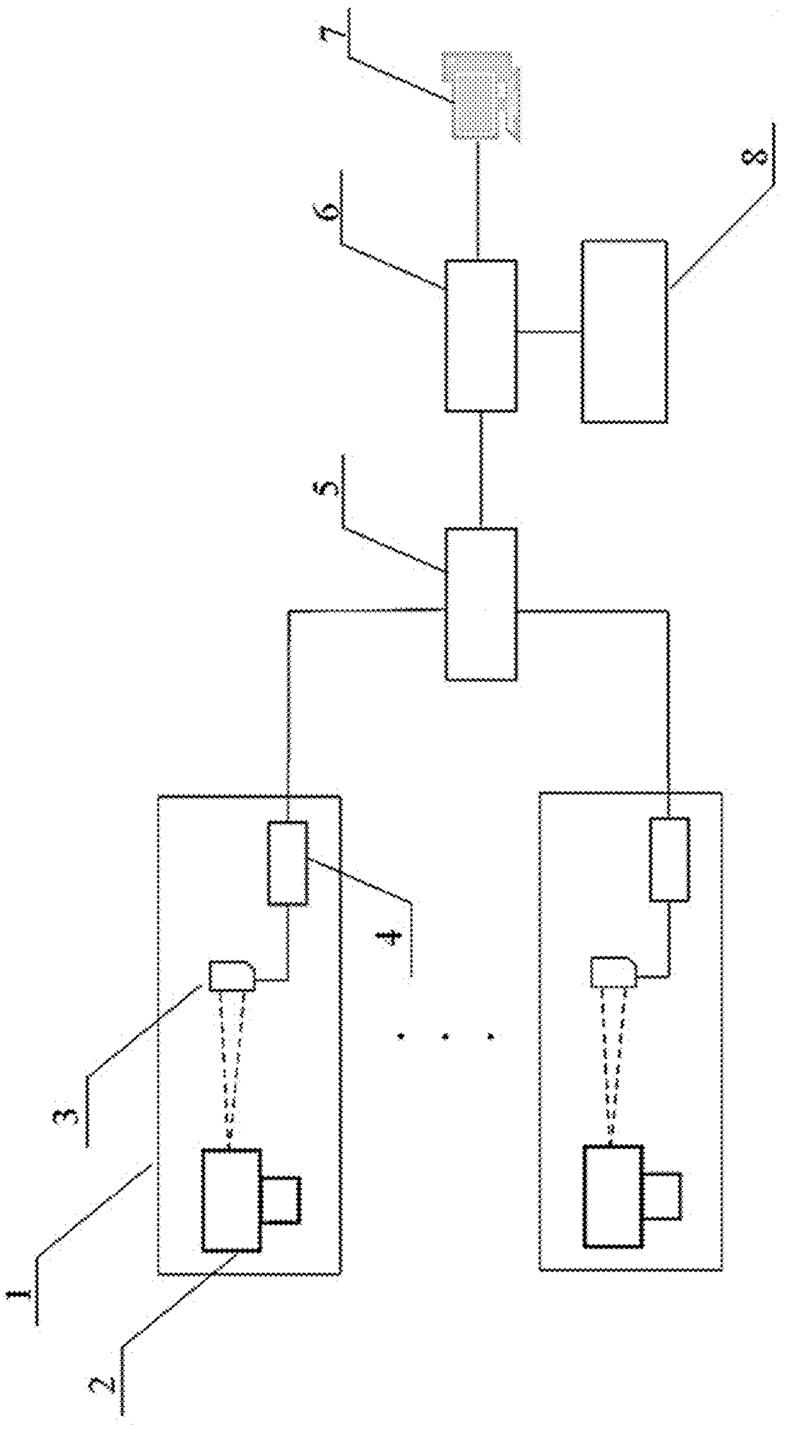
FIG. 1 is a structural schematic view of the present invention.

Reference signs in FIG. 1: 1, switch machine; 2, pressure spring adjustment nut of a switch machine connector; 3, laser sensor; 4, displacement acquisition unit of a switch machine actuating rod; 5, communication unit; 6, station server; 7, station detection terminal; and 8, signal centralized monitoring system server.

Figure 2:
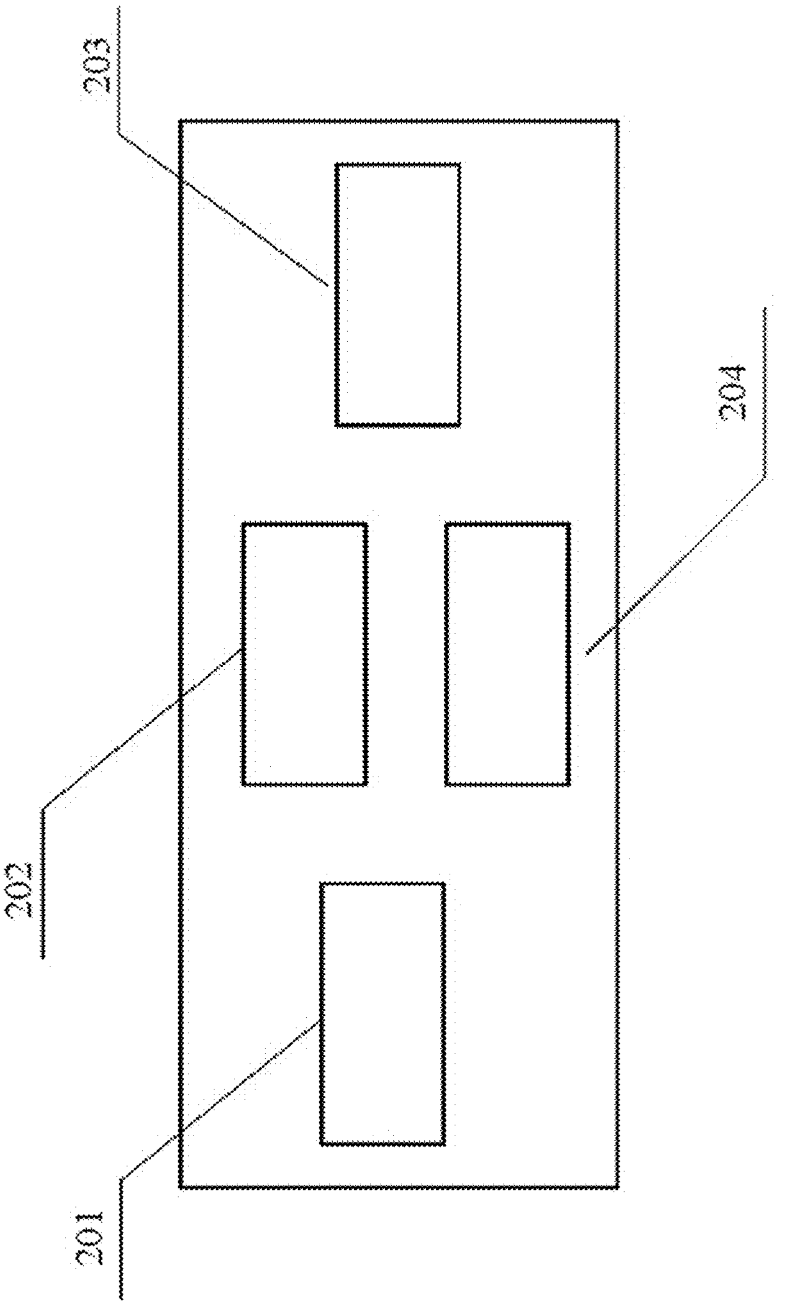
FIG. 2 is a structural schematic view of an acquisition unit according to the present invention.

Reference signs in FIG. 2: 201, digital-to-analog conversion module; 202, microprocessor; 203, communication module; and 204, power supply module.

DESCRIPTION OF THE EMBODIMENTS

The technical solutions in the embodiments of the present invention will be clearly and completely described hereafter with reference to the drawings in the embodiments of the present invention. It is apparent that the described embodiments are some rather than all of the embodiments of the present invention. On the basis of the embodiments in the present invention, all the other embodiments obtained by a person skilled in the art without requiring the exercise of inventive effort are all concluded in the scope of protection of the present invention.

As shown in FIG. 1, the present invention provides a system for measuring displacement of a switch machine actuating rod, including a laser sensor 3, a switch machine actuating rod displacement acquisition unit (hereinafter referred to as acquisition unit), a communication unit 5, a station server 6, and a station monitoring terminal 7, wherein the laser sensor and the acquisition unit are respectively mounted in a switch machine 1; the laser sensor is fixed at one end of the actuating rod; and a laser reflection surface is a pressure spring adjustment nut 2 of a switch machine connector. The acquisition unit consists of a digital-to-analog conversion module 201, a microprocessor 202, a communication module 203, and a power supply module 204, as shown in FIG. 2. The acquisition unit 4 supplies power to the laser sensor 3 and acquires an analog current outputted thereby. One power cable is led out from a power supply circuit of the switch machine to supply power to the acquisition unit.

The acquisition unit 4 is connected to the communication unit 5 by means of a data wire such as, without loss of generality, Ethernet, RS485, RS422, RS232, CAN bus and the like. The communication unit is used for data forwarding and protocol conversion, and a plurality of acquisition units share one communication unit.

The communication unit 5 is connected to the station server 6 by means of a data wire such as, without loss of generality, a power carrier cable, a WLAN, a mobile network, an Ethernet, an optical fiber network protocol and the like.

The station server acquires section occupation and emptying information, switch transaction information and the like from the signal centralized monitoring system server, transmits an instruction to the acquisition unit, stores the displacement data of the switch machine actuating rod, and provides a webpage service for the station monitoring terminal.

The station server is connected to the signal centralized monitoring system server by means of a data wire, and acquires the section occupation and emptying information, switch transaction data by means of, without loss of generality, an Ethernet, RS232, RS485 and the like.

The station monitoring terminal can view the displacement data of the actuating rod of the system, and performs configuration management.

Figure 3:
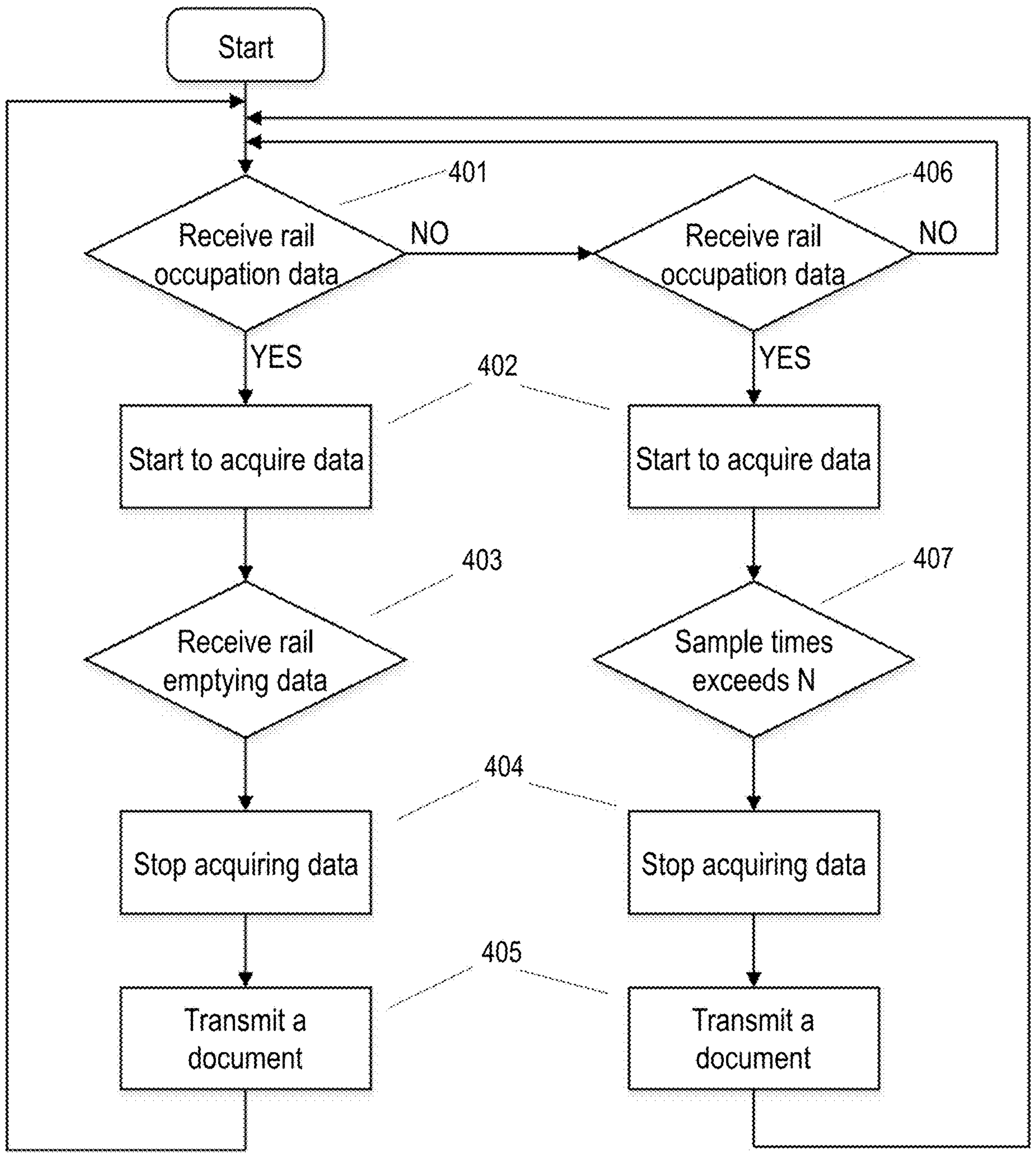
FIG. 3 is a flow chart of software of the acquisition unit according to the present invention.

FIG. 3 is a specific flow of the system of the present invention, through which process the displacement data of the switch machine actuating rod is acquired and uploaded.

After the station server receives the section rail occupation information from the signal centralized monitoring system server in step 401, step 402 is executed to transmit a start-to-acquire-data command to the acquisition units of all the switches of the section, and the acquisition units start to regularly acquire the analog current output of the laser sensor.

After the station server receives the section rail emptying information from the signal centralized monitoring system server in step 403, step 404 is executed to transmit a stop-acquiring-data command to the acquisition units of all the switches of the section, and the acquisition units stop acquiring the analog current output of the laser sensor; and step 405 is executed to transmit a document formed by the acquired data to the station server.

After the station server receives the switch transaction information from the signal centralized monitoring system server in step 406, step 402 is executed to transmit a start-to-acquire-data command to the acquisition units of all the switch machines of the switch, and the acquisition units start to regularly acquire the analog current output of the laser sensor. After the sampling times exceeds a preset number N in step 407, step 404 is executed, and the acquisition units stop acquiring the analog current output of the laser sensor; and step 405 is executed to transmit a document formed by the acquired data to the station server.

The station server stores and analyzes the received document for the station monitoring terminal to call and read.

The descriptions above are only preferred embodiments of the present invention. However, the scope of protection of the present invention is not limited to the embodiments; any person skilled in the art can easily conceive of various equivalent amendments or substitutions in the technical scope disclosed by the present invention; and these amendments or substitutions shall be all concluded in the scope of protection of the present invention. Therefore, the scope of protection of the claims shall prevail as the scope of protection of the present invention.

What is claimed is:

1. A system for measuring displacement of a switch machine actuating rod, wherein the system is mounted on a switch machine, wherein the system comprises a laser sensor, an acquisition unit, a communication unit, a station server, a station monitoring terminal, and a signal centralized monitoring system server, the laser sensor and the acquisition unit are respectively mounted in the switch machine; the laser sensor is fixed at one end of the switch machine actuating rod; the acquisition unit is connected to the communication unit; the communication unit is connected to the station server; and the station server is connected to the station monitoring terminal and the signal centralized monitoring system server respectively, wherein the acquisition unit comprises a digital-to-analog conversion module, a microprocessor, a communication module, and a power supply module; and the microprocessor is connected to the digital-to-analog conversion module, the communication module, and the power supply module respectively.

2. The system for measuring displacement of a switch machine actuating rod according to claim 1, wherein a reflection surface of the laser sensor for emitting a laser is a pressure spring adjustment nut of a switch machine connector.

3. The system for measuring displacement of a switch machine actuating rod according to claim 1, wherein the acquisition unit is connected to the communication unit by means of an Ethernet or a RS485 or a RS422 or a RS232 or a CAN bus.

4. The system for measuring displacement of a switch machine actuating rod according to claim 1, wherein the communication unit is connected to the station server by means of a power carrier cable or a WLAN or a mobile network or an Ethernet or an optical fiber network.

5. The system for measuring displacement of a switch machine actuating rod according to claim 1, wherein the station server is connected to the signal centralized monitoring system server by means of an Ethernet or a RS232 or a RS485.

6. The system for measuring displacement of a switch machine actuating rod according to claim 1, wherein the station server stores and analyzes a received document.

7. The system for measuring displacement of a switch machine actuating rod according to claim 1, wherein the station monitoring terminal can call and read data in the station server, and performs a configuration management.

8. The system for measuring displacement of a switch machine actuating rod according to claim 1, wherein an acquisition action of the acquisition unit is to regularly acquire an analog current output of the laser sensor.

9. A measurement method using the system for measuring displacement of a switch machine actuating rod in claim 1, wherein the measurement method comprises following steps:

step 1), receiving by the station server section rail occupation information transmitted by the signal centralized monitoring system server, then transmitting a start-to-acquire instruction to the acquisition unit by means of the communication unit, and going to step 2); if no occupation information is received, then going to step 3);

step 2), receiving by the station server section rail emptying information transmitted by the signal centralized monitoring system server, then transmitting a stop-acquiring instruction to the acquisition unit by means of the communication unit, and going to step 3);

step 3), receiving by the station server a document formed by acquired data transmitted by the acquisition unit by means of the communication unit, and going back to step 1);

step 4), receiving by the station server transaction action information of a switch transmitted by the signal centralized monitoring system server, then transmitting a start-to-acquire instruction to all the acquisition units of the switch by means of the communication unit, and going to step 5); and step 5), receiving by the station server a document formed by the acquired data transmitted by the acquisition unit by means of the communication unit after regular sampling times exceeds N, and going back to step 1).

* * * * *